United States Patent
Yoneda et al.

(10) Patent No.: US 9,030,738 B2
(45) Date of Patent: May 12, 2015

(54) STEREOSCOPIC IMAGE VIEWING DEVICE

(75) Inventors: Keisuke Yoneda, Osaka (JP); Akira Kakinuma, Osaka (JP); Fumio Kato, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 186 days.

(21) Appl. No.: 13/808,244

(22) PCT Filed: Jul. 8, 2011

(86) PCT No.: PCT/JP2011/003926
§ 371 (c)(1),
(2), (4) Date: Jan. 3, 2013

(87) PCT Pub. No.: WO2012/020537
PCT Pub. Date: Feb. 16, 2012

(65) Prior Publication Data
US 2013/0107363 A1    May 2, 2013

(30) Foreign Application Priority Data
Aug. 9, 2010   (JP) .................. 2010-178276

(51) Int. Cl.
*G02B 27/22* (2006.01)
*G02C 9/04* (2006.01)
*H04N 13/04* (2006.01)

(52) U.S. Cl.
CPC ............ *G02B 27/22* (2013.01); *G02B 27/2264* (2013.01); *G02C 9/04* (2013.01); *H04N 13/0438* (2013.01); *H04N 13/0434* (2013.01); *H04N 13/0497* (2013.01)

(58) Field of Classification Search
None
See application file for complete search history.

(56) References Cited

U.S. PATENT DOCUMENTS 5,281,957 A * 1/1994 Schoolman .................. 345/8
5,463,428 A * 10/1995 Lipton et al. ............... 351/158
2010/0164840 A1 7/2010 Yamamoto

FOREIGN PATENT DOCUMENTS

| JP | 62-231578 A | 10/1987 |
| JP | 08-036143 A | 2/1996 |
| JP | 09-005674 A | 1/1997 |
| WO | WO-2008/084751 A1 | 7/2008 |

OTHER PUBLICATIONS

International Search Report mailed Oct. 11, 2011 issued in corresponding International Application PCT/JP2011/003926.

* cited by examiner

*Primary Examiner* — Jade R Chwasz
(74) *Attorney, Agent, or Firm* — McDermott Will & Emery LLP

(57) ABSTRACT

A stereoscopic image viewing device to be attached for stereoscopic image viewing to eyeglasses; which includes: a pair of light shutters for right and left eyes; a driver circuit for the light shutters; a power source unit for driving the light shutters; a bridge for supporting the light shutters at their inside edges; a binding portion for removably binding the stereoscopic image viewing device to the eyeglasses; and a support for supporting the driver circuit and the power source unit. The power source unit includes a secondary battery. The binding portion and the support are integrally formed with the bridge. The stereoscopic image viewing device has a center of gravity positioned in the bridge.

11 Claims, 5 Drawing Sheets

1

STEREOSCOPIC IMAGE VIEWING DEVICE

RELATED APPLICATIONS

This application is the U.S. National Phase under 35 U.S.C. § 371 of International Application No. PCT/JP2011/003926, filed on Jul. 8, 2011, which in turn claims the benefit of Japanese Application No. 2010-178276, filed on Aug. 9, 2010, the disclosures of which Applications are incorporated by reference herein.

TECHNICAL FIELD

The present invention relates to stereoscopic image viewing devices, more specifically to a stereoscopic image viewing device to be attached to eyeglasses to view stereoscopic images.

BACKGROUND ART

Some stereoscopic image viewing devices (simply referred to below as viewing devices) generally called 3D eyeglasses or 3D glasses support active system and some support passive system.

In the active system, a right-eye image and a left-eye image are displayed on a display device, such as a television, while being alternatingly switched therebetween, and liquid crystal shutters or suchlike disposed on right and left lens portions of a viewing device are alternatingly opened/closed in synchronization with switching of images on the display device (see Patent Literature 1).

Display devices used with the active system are structured approximately in the same manner as conventional display devices, and simply using stereoscopic image data as image data to be displayed on the display devices allows stereoscopic image viewing.

On the other hand, in the passive system, right-eye and left-eye images are simultaneously displayed line-by-line on the display device, and in the display device, a polarizing filter sorts the images for the right eye and the left eye. Then, the sorted images are respectively delivered to the right eye and the left eye through specialized eyeglasses. Accordingly, in the passive system, 3D images could not be properly viewed unless the images are viewed generally in front of the display device, and since the right-eye and left-eye images are displayed on one screen at the same time, the resolution is low. Therefore, for viewing on a household television, the active stereoscopic image viewing system is preferable for users.

However, in the active system, the viewing device is required to include liquid-crystal light shutters and a power source for driving them, so that the viewing device becomes heavier and bulkier than normal eyeglasses. Therefore, many users feel discomfort with wearing the viewing device.

CITATION LIST

Patent Literatures

Patent Literature 1: Japanese Laid-Open Patent Publication No. 62-231578

SUMMARY OF INVENTION

Technical Problem

Accordingly, active stereoscopic image viewing systems are desired to have lighter viewing devices for improved comfort of wearing. Currently, it is the mainstream practice to use a small, lightweight, coin-shaped battery (primary battery) for a drive power source. Also, to achieve a lighter viewing device, it is under study to use a laminated battery as a drive power source since laminated batteries can be rendered thinner more easily than coin-shaped batteries.

However, a reduction in the battery weight leads to a reduction in capacity. To allow the viewing device to be used continuously for a significant period of time, a certain battery capacity needs to be ensured. Accordingly, a battery of a certain weight needs to be used as the power source of the viewing device. Moreover, the liquid-crystal light shutters are heavier than normal lenses made of plastic or suchlike, and therefore even if the weight of the battery is reduced, it is not possible to avoid the weight of the entire viewing device being heavier than normal eyeglasses.

Further, another problem is that coin-shaped batteries and laminated batteries have wide shapes, so that if such a battery is used as the power source of the viewing device, a housing that occupies a considerable area needs to be provided in the viewing device. This limits the design of the viewing device.

Furthermore, to view 3D images, users of normal eyeglasses for myopia or hyperopia correction need to wear eyewear-like viewing devices over their normal eyeglasses. This further worsens the comfort of wearing the viewing device.

Therefore, an objective of the present invention is to allow even users of normal eyeglasses to wear active-shutter stereoscopic image viewing devices with comfort.

Solution to Problem

One aspect of the present invention is directed to a stereoscopic image viewing device to be attached for stereoscopic image viewing to eyeglasses, including:
a pair of light shutters for right and left eyes;
a driver circuit for the light shutters;
a power source unit for driving the light shutters;
a bridge for supporting the light shutters at their inside edges;
a binding portion for removably binding the stereoscopic image viewing device to the eyeglasses; and
a support for supporting the driver circuit and the power source unit,
the power source unit including a secondary battery,
the binding portion and the support being integrally formed with the bridge, and
a center of gravity of the stereoscopic image viewing device being positioned in the bridge.

In another aspect of the present invention, the secondary battery of the stereoscopic image viewing device has a cylindrical or rectangular shape with a diameter or width of 2 mm to 6 mm. Here, the term "rectangular" encompasses shapes where the cross section is elliptical or the cross section includes a pair of parallel lines and has semicircular portions on opposite sides. Herein, the width of the rectangular secondary battery refers to the length of the major axis of the cross section.

Advantageous Effects of Invention

In the stereoscopic image viewing device of the present invention, the binding portion for binding the stereoscopic image viewing device to normal eyeglasses is integrally formed with the support for the driver circuit and the power source unit for the light shutters, thereby making it possible to omit temples, earpieces, nose pads, etc., from conventional 3D eyeglasses or 3D glasses and achieve weight reduction. Thus, even users of normal eyeglasses can wear such viewing devices with comfort. Moreover, since the cylindrical or rectangular secondary battery is used for the power source unit for driving the light shutters, the flexibility in battery arrangement increases, facilitating optimization of left-right weight balance. Thus, the wearing comfort can be further enhanced.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
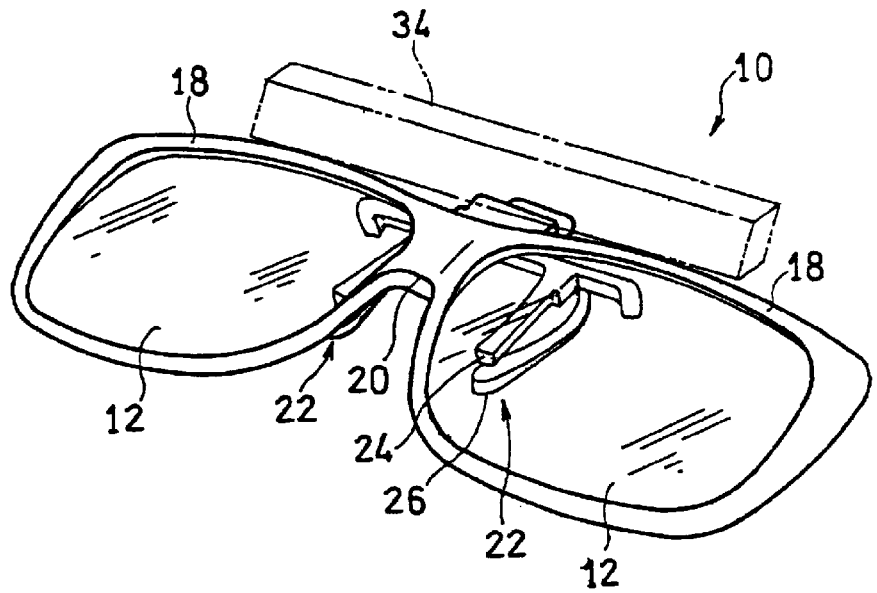
FIG. 1 is an oblique view illustrating the appearance of a stereoscopic image viewing device according to an embodiment of the present invention.

The present invention is directed to a stereoscopic image viewing device to be attached for stereoscopic image viewing to eyeglasses. This viewing device includes a pair of light shutters for right and left eyes, a driver circuit for the light shutters, a power source unit for driving the light shutters, a bridge for supporting the light shutters at their inside edges, a binding portion for removably binding the stereoscopic image viewing device to the eyeglasses, and a support for supporting the driver circuit and the power source unit. Note that the light shutters may be respectively supported by a pair of rims and may also be supported by the bridge via the rims.

The power source unit includes a secondary battery. The binding portion and the support are integrally formed with the bridge. In this case, the driver circuit, the power source unit, and the support are preferably arranged such that the viewing device has a center of gravity positioned within 10 mm from a plane that passes through a center of gravity of the bridge and is perpendicular to a segment connecting centers of gravity of the light shutters.

For an eyewear-like stereoscopic image viewing device, liquid-crystal light shutters are preferably used as light shutters for right and left eyes from the viewpoint of speed and quietness at the time of opening/closing of the shutters. However, liquid-crystal light shutters are heavier (e.g., 6 g to 15 g each) than plastic lenses of normal eyeglasses (for lightweight lenses, 4 g to 7 g each).

Since such heavy light shutters and a power source unit for driving the shutters are necessarily provided, the eyewear-like stereoscopic image viewing device is considerably heavier than normal eyeglasses. As a result, the comfort of wearing the viewing device is worsened. When the user of the eyewear-like viewing device wears normal eyeglasses, the user needs to wear the viewing device over the eyeglasses, resulting in further discomfort of wearing.

Therefore, the viewing device of the present invention is provided with a binding portion for attaching the viewing device to normal eyeglasses, thereby eliminating the need for temples, earpieces, nose pads, etc., for allowing the user to wear the viewing device. As a result, the weight of the viewing device can be reduced. Furthermore, it is not necessary to wear a viewing device with temples and nose pads over normal eyeglasses, and therefore users of normal eyeglasses can enjoy significantly enhanced comfort of wearing the viewing device.

Furthermore, the driver circuit, the power source unit, and the support are arranged such that the center of gravity of the viewing device is positioned approximately at the center of the device, achieving good right-left weight balance of the viewing device, further improving the wearing comfort.

Here, the secondary battery preferably has a cylindrical or rectangular shape with a diameter or width of 2 mm to 6 mm. By setting the diameter or width of the secondary battery to be 6 mm or less, it is rendered possible to eliminate the need to provide a voluminous housing portion in the viewing device. Consequently, the position of the secondary battery can be freely determined without sacrificing design. Thus, the secondary battery can be readily positioned to optimize right-left weight balance. On the other hand, since the secondary battery has a diameter of 2 mm or more, the secondary battery can be manufactured significantly more readily than in the case where the secondary battery is manufactured to have a smaller diameter. Thus, an increase in manufacturing cost of the battery can be inhibited. Moreover, it is rendered easy to ensure that the battery has a sufficient capacity. In general, cylindrical or rectangular batteries include metal can casings. In addition, these shapes are resistant to an increase in internal pressure, and therefore a large amount of material can be accommodated even in a small volume. Moreover, high resistance to external force provides suitability for inclusion in flexible portions, such as temples and earpieces.

Furthermore, instead of using a primary battery, which is prevalently used in conventional active 3D eyeglasses, the secondary battery is used as the power source unit, reducing the need to change the battery. Accordingly, the secondary battery can be fixed by a support in such a manner that the user would not be expected to remove the battery. As a result, it is possible to eliminate the need to provide the viewing device with a mechanism for the support to removably hold the battery (e.g., a lid with a catch), thereby simplifying the support. Moreover, in the case of the secondary battery, even if its weight and capacity are reduced to a degree lighter and smaller than a primary battery to be used as the power source unit, the secondary battery can be simply charged for continuous use, facilitating weight reduction compared to the case where the primary battery is used. Thus, the wearing comfort can be enhanced.

In one embodiment of the present invention, the stereoscopic image viewing device includes an attaching mechanism for removably attaching the light shutters to the bridge. Thus, the user can freely replace the light shutters with other light shutters that suit his/her own eyeglasses in terms of shape and size, rendering 3D image viewing more comfortable.

In another embodiment of the present invention, positions at which the light shutters are attached to the bride by the attaching mechanism are vertically changeable.

Accordingly, the light shutters of the viewing device can be adjusted in their vertical positions so as to be in good alignment with lenses of various shapes of normal eyeglasses. Thus, 3D image viewing can be rendered more comfortable.

In still another embodiment of the present invention, the attaching mechanism of the stereoscopic image viewing device includes projections respectively provided at the inside edges of the light shutters, a pair of recesses provided in the bridge so as to be engageable with and detachable from the projections, first connectors provided at the projections and connected to the light shutters, and second connectors provided at the recesses and connected to the driver circuit. When the projections are in engagement with the recesses, the first and second connectors are coupled so that the light shutters and the driver circuit are connected to each other.

In still another embodiment of the present invention, the attaching mechanism of the stereoscopic image viewing device includes recesses respectively provided at the inside edges of the light shutters, a pair of projections provided at the bridge so as to be engageable with and detachable from the recesses, first connectors provided at the recesses and connected to the light shutters, and second connectors provided at the projections and connected to the driver circuit. When the recesses are in engagement with the projections, the first and second connectors are coupled so that the light shutters and the driver circuit are connected to each other.

In yet another embodiment of the present invention, the attaching mechanism of the stereoscopic image viewing device includes projections respectively provided at the inside edges of the light shutters, the projections having the same shape and being situated at vertically different positions, a pair of recesses provided in the bridge so as to be engageable with and detachable from the projections, first connectors provided at their respective projections and connected to the light shutters, and second connectors provided at the recesses and connected to the driver circuit.

One of the recesses is engaged with one of the projections provided at one of the light shutters, and the other of the recesses is engaged with one of the projections provided at the other of the light shutters. When the projections are in engagement with the recesses, the first and second connectors are coupled so that the light shutters and the driver circuit are connected to each other.

Likewise, in yet another embodiment of the present invention, the attaching mechanism of the stereoscopic image viewing device includes recesses respectively provided at the inside edges of the light shutters, the recesses having the same shape and being situated at vertically different positions, a pair of projections provided at the bridge so as to be engageable with and detachable from the recesses, first connectors provided at their respective recesses and connected to the light shutters, and second connectors provided at the projections and connected to the driver circuit.

One of the projections is engaged with one of the recesses provided at one of the light shutters, and the other of the projections is engaged with one of the recesses provided at the other of the light shutters. When the recesses are in engagement with the projections, the first and second connectors are coupled so that the light shutters and the driver circuit are connected to each other.

Thus, it is possible to eliminate the need to provide a viewing device including an attaching mechanism, with connectors for connecting a pair of light shutters to a power source unit and a driver circuit, separately from the attaching mechanism, which facilitates improvements in design, and replacement and positional adjustments of the light shutters.

Hereinafter, an embodiment of the present invention will be described with reference to the drawings.

Figure 2:
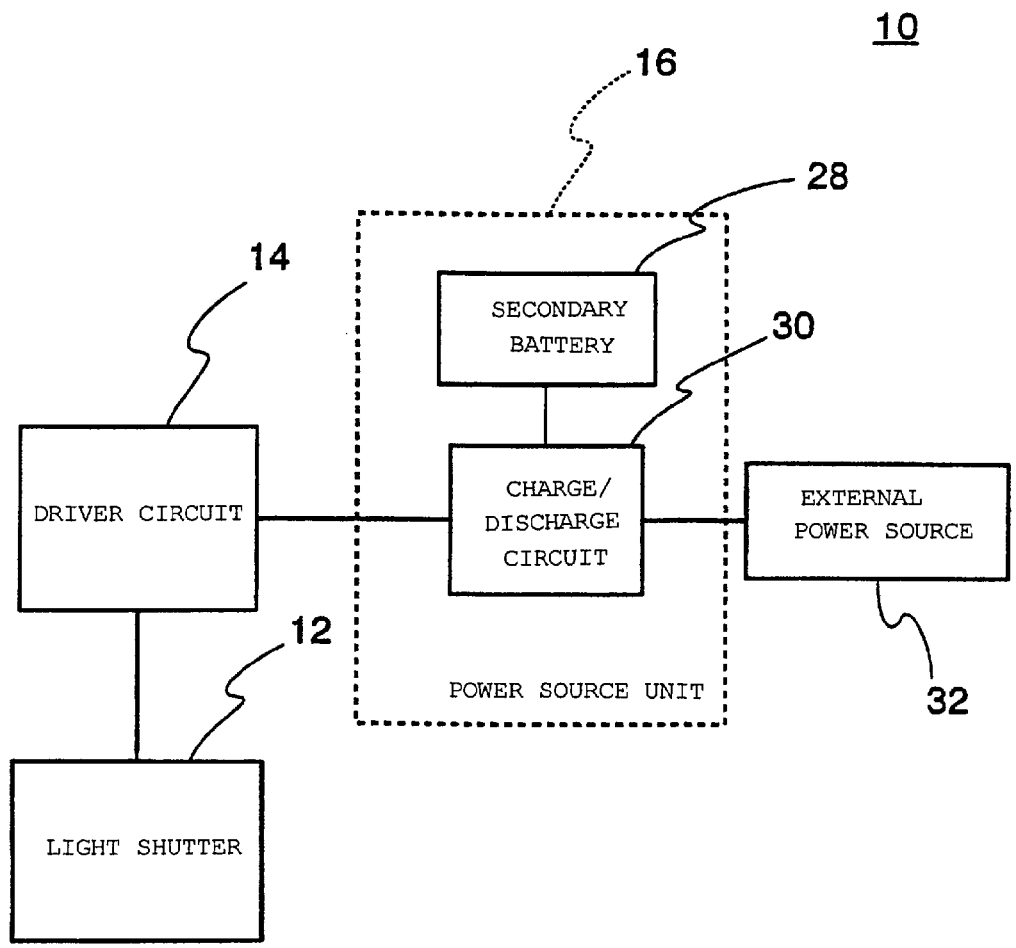
FIG. 2 is a functional block diagram of the viewing device in FIG. 1.

FIG. 1 is an oblique view of a stereoscopic image viewing device according to Embodiment 1 of the present invention. FIG. 2 shows a functional block diagram of the stereoscopic image viewing device.

The stereoscopic image viewing device (referred to below as the viewing device) 10 is a viewing device intended to be attached to normal eyeglasses and compatible with an active-shutter stereoscopic image viewing system.

The active-shutter stereoscopic image viewing system is a system for viewing stereoscopic images in which right-eye and left-eye images are displayed on a display device such as a 3D television while being alternatingly switched at high speed, and light shutters of the viewing device 10 are alternatingly opened/closed in synchronization with the switching of images on the display device.

In the viewing device 10, right-eye and left-eye light shutters 12 have unillustrated electrodes connected to a driver circuit 14, which is in turn connected to a power source unit 16 for driving the light shutters 12. The power source unit 16 includes a secondary battery 28 and a charge/discharge circuit 30 for controlling charge and discharge of the secondary battery 28. The charge/discharge circuit 30 is connected to the driver circuit 14. The charge/discharge circuit 30 is connected to the secondary battery 28, and can be connected to an external power source 32 such as a commercial power source.

The light shutters 12 are held by a pair of rims 18, respectively. The rims 18 are supported by a bridge 20 at their inside edges. The bridge 20 is integrally formed with a pair of clips 22 for holding the viewing device 10 on normal eyeglasses.

Each clip 22 includes a fixed member 24 secured on the bridge 20, and a movable member 26 biased toward the fixed member 24 by an unillustrated biasing means (e.g., a helical spring or a flat spring). The biasing means provide biasing force to keep the lenses of the normal eyeglasses between the fixed members 24 and the movable members 26 of the clips 22, thereby binding the viewing device 10 to the normal eyeglasses.

Disposed above the bridge 20 and the rims 18 is a support 34 integrally formed with the bridge 20. The support 34 provides support to secure the driver circuit 14 and the power source unit 16 on the bridge 20.

The unillustrated display device (such as a 3D television) transmits a synchronization signal specifying the timing of opening and closing the light shutters 12, and the bridge 20 is provided with an unillustrated reception portion for receiving the synchronization signal. The synchronization signal received by the reception portion is transmitted to the driver circuit 14.

As the light shutters 12, liquid-crystal light shutters are preferably used from the viewpoint of operation speed and quietness. Liquid-crystal light shutters operate so as to become transparent upon voltage application and opaque upon cessation of voltage application.

Figure 3:
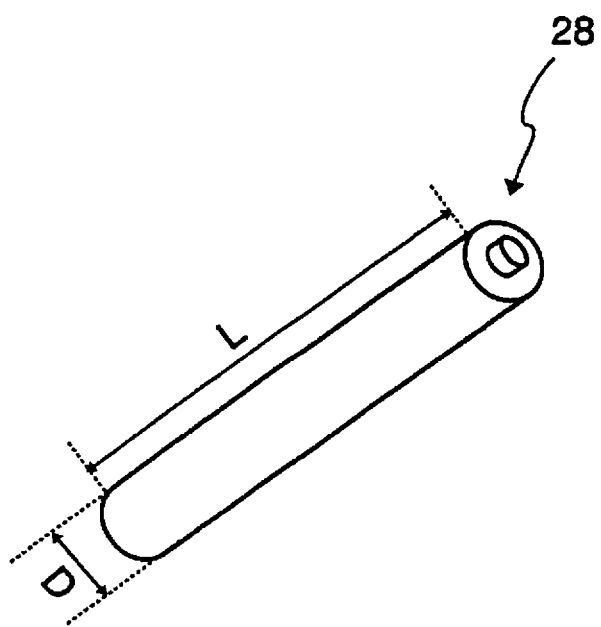
FIG. 3 is an oblique view illustrating the appearance of a secondary battery.

FIG. 3 is an oblique view of the appearance of a secondary battery. The secondary battery 28 preferably has an elongated shape 2 mm to 6 mm in diameter or width D and 15 mm to 35 mm in length L. As the secondary battery 28, a non-aqueous electrolyte secondary battery, in particular, a lithium-ion secondary battery, is preferably used in view of high energy density. The capacity of the secondary battery 28 can be in the range from 10 mAh to 100 mAh, for example. Note that the secondary battery 28 is not limited to a cylindrical shape as shown in the figure, and secondary batteries of various shapes such as a rectangular shape can be used. In general, cylindrical or rectangular batteries include metal can casings. In addition, the term "rectangular" refers to a shape corresponding to a rectangular battery as it is called in the field of battery, and the tube portion has at least a pair of parallel planes. The rectangular shape encompasses a thin flat shape with rounded edges. Moreover, the width of a rectangular secondary battery refers to the greater of the widths where there are narrow and wide widths.

Here, setting the secondary battery 28 to be 2 mm or more in diameter or width D facilitates easy manufacturing of the secondary battery 28 compared to the case where diameter D is smaller, resulting in reduced production cost. Moreover, it is ensured that the secondary battery 28 can have a satisfactory capacity. On the other hand, the reason for the secondary battery 28 to be 6 mm or less in diameter D is to render the secondary battery 28 inconspicuous more readily without compromising design when compared to the case where diameter D is greater.

In this manner, the secondary battery 28 is sized and shaped as mentioned above so that the secondary battery 28 can be arranged to optimize right-left weight balance of the viewing device 10 without sacrificing design. Thus, the comfort of wearing the viewing device 10 can be enhanced.

In this case, where the support 34, the driver circuit 14, and the power source unit 16 are considered as a combined unit, the driver circuit 14 and the power source unit 16 are arranged such that the center of gravity of the combined unit coincides with the center or the center of gravity of the bridge 20, or the center of gravity of the combined unit is positioned in a plane that passes through the center of the bridge 20 and is perpendicular to a segment connecting the centers of gravity of the left and right light shutters (hereinafter, this is also referred to by the phrase "the center of gravity is positioned at the center of the bridge"). As a result, the center of gravity of the viewing device 10 can be positioned within 10 mm from the plane. Thus, the comfort of wearing the viewing device 10 is enhanced.

For example, the secondary battery 28, the driver circuit 14, and the charge/discharge circuit 30 are arranged such that the centers of gravity of these components are positioned at the center of the bridge 20. As a result, the center of gravity of the combined unit can coincide with the center of the bridge 20.

However, in the above example, all of the components are concentrated at the center, so that the central portion could become bulky. To avoid this, the components are conceivably distributed to the left and the right. For example, the secondary battery 28 is disposed to the right of the bridge 20 (the right side as viewed from the user wearing the viewing device 10; the same applies hereinafter), and the charge/discharge circuit 30 and the driver circuit 14 are disposed to the left of the bridge 20. In this case, the secondary battery 28, which is relatively heavy, is arranged near the bridge 20. On the other hand, the charge/discharge circuit 30 and the driver circuit 14 are arranged slightly distant from the bridge 20. In this manner, the center of gravity of the combined unit can coincide with the center of the bridge 20.

Next, an example of the secondary battery 28 will be described where the secondary battery 28 is a lithium-ion secondary battery.

Figure 4:
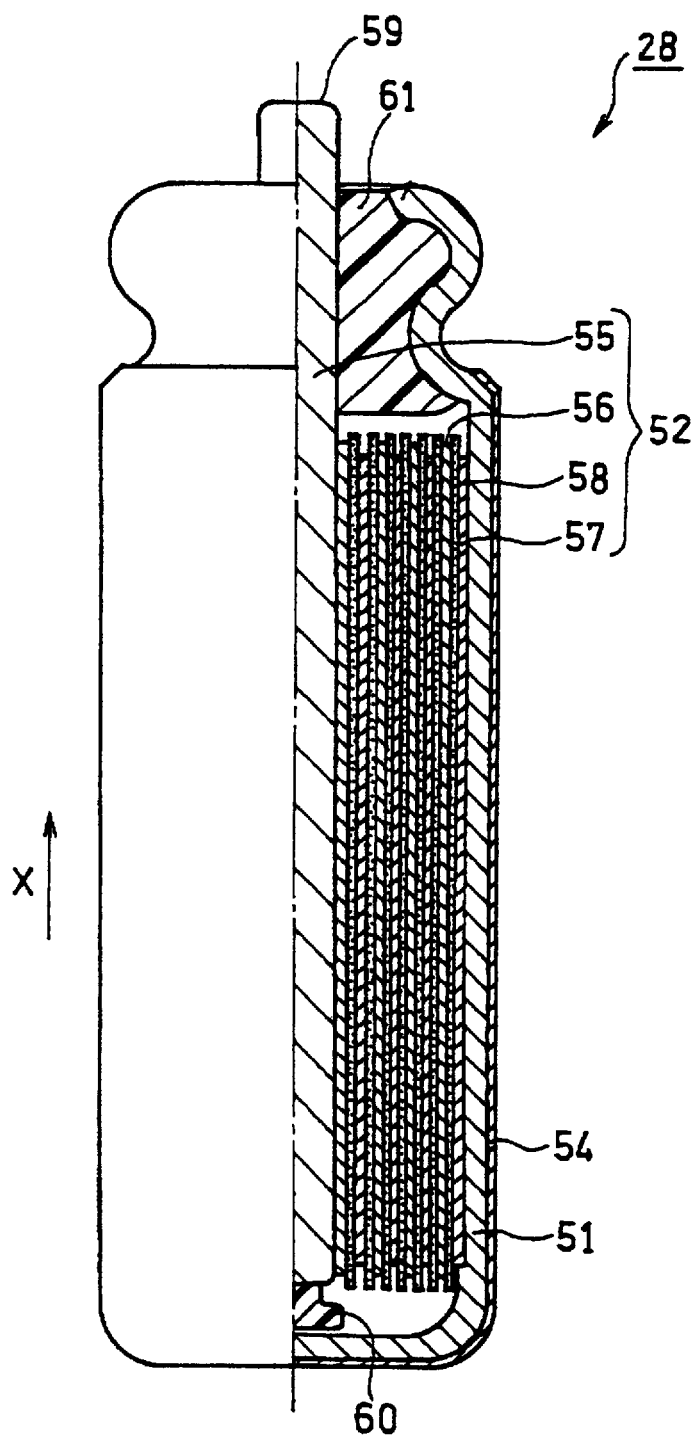
FIG. 4 is a side view, partially in cross section, illustrating details of an exemplary secondary battery.

As shown in FIG. 4, the secondary battery 28 includes a battery case 51 in a bottomed cylindrical shape, a group of wound electrodes 52 housed in the battery case 51, and an insulating gasket 61 for sealing the battery case 51. The battery case 51 has an insulating cover 54 around its outer surface.

The electrode group 52 includes a conductive core 55, a negative electrode 56, a positive electrode 57, and a separator 58 for isolating the negative electrode 56 and the positive electrode 57 from each other. The electrode group 52 is in contact with a nonaqueous electrolyte.

The outermost layer of the electrode group 52 is the positive electrode 57 in electrical contact with the inner surface of the battery case 51. The bottom and side surfaces of the battery case 51 are exposed to the outside and used as external positive terminals.

The core 55 has one end 59 exposed to the outside of the battery case and used as a negative terminal. The core 55 is fitted at that end in a hole of the insulating gasket 61. The core 55 has an insulating cap 60 attached at the other end to prevent short circuit with the battery case 51.

The negative electrode 56 has one end welded to the core 55. As a result, the negative electrode 56 is electrically connected to the core 55.

The negative electrode 56 has a strip of negative electrode collector and negative electrode active material layers formed on opposite surfaces of the negative electrode collector. The negative electrode 56 preferably has a total thickness of 35 μm to 150 μm.

The negative electrode active material layers are not formed in some portions of the negative electrode 56, exposing the surfaces of the collector 21 at the end of the negative electrode 56. The exposed end is welded to the core 55.

The material of the negative electrode collector does not cause chemical change within the range of potentials at which to charge/discharge the negative electrode active material to be used.

A carbon material such as black lead, silicon oxide, an alloy including silicon, or the like, can be used as the negative electrode active material. However, to achieve a small-sized battery with high capacity, the negative electrode active material layer preferably has a capacity density of 1000 mAh/cm$^3$ or more. Note that the capacity density refers to the capacity (reversible capacity) (mAh) per cm$^3$ of the negative electrode active material layer.

In the case where a thin film including silicon with high capacity density is formed on the surface of a negative electrode collector by vapor deposition, a negative electrode active material with a high capacity density of about 1200 mAh/cm$^3$ to 1300 mAh/cm$^3$ can be obtained. Even a small-sized battery can have high capacity if its energy density is increased.

For high capacity density, preferable negative electrode active materials are silicon, an alloy including silicon, and silicon oxide, and particularly preferable is silicon oxide. An alloy including silicon, and silicon oxide expand and contract to a relatively high degree upon charge and discharge, but they can be preferably used for small-sized batteries because the magnitude of their expansion and contraction decreases with the size of batteries, so that the expansion and contraction has less effect on the batteries.

Silicon oxide is preferably $SiO_x$ ($0 \leq x \leq 2$). As x decreases, the capacity of the active material increases, but the volume of the active material changes to a greater extent due to expansion and contraction of the active material upon charge and discharge. Moreover, as x increases, the volume of the active material changes to a lesser extent due to expansion and contraction of the active material upon charge and discharge, but irreversible capacity increases. The small-sized battery of the present invention is relatively less affected by the volume change of the active material. Thus, $0 < x \leq 1.1$ is preferable from the viewpoint of the volume change and reversible capacity of the active material in the small-sized battery.

The alloy including silicon is preferably an alloy of silicon and at least one element selected from the group consisting of iron, cobalt, nickel, copper, and titanium.

Since the core 55 is electrically connected to the negative electrode 56, a material that does not cause chemical change within the range of potentials at which to charge/discharge the negative electrode active material to be used may be used for the core 55. Specifically, stainless steel (SUS), copper, a copper alloy, aluminum, iron, nickel, palladium, gold, silver, and platinum can be used for the core 55. They may be used alone or in combination of two or more.

The material of the core 55 is preferably the same as the material of the negative electrode collector. The core 55 has a shape suitable for welding with the negative electrode 56. The core 55 is preferably rod-shaped. The rod-shaped core 55 preferably has a flat portion along its length. The flat part can be in surface contact with an electrode.

The positive electrode 57 is the outermost layer of the electrode group, and is coated on one side (at the portion where the positive electrode collector is exposed) so as to have a positive electrode active material layer formed on the surface that faces the inner circumference of the positive electrode collector and no positive electrode active material layer formed on the surface that faces the outer circumference of the positive electrode collector. The surface of the portion where the positive electrode collector is exposed is in close contact with the inner surface of the battery case. In this manner, the positive electrode 57 electrically contacts the battery case 51.

For the positive electrode collector, a strip of metallic foil, preferably, aluminum foil or aluminum alloy foil, is used.

From the viewpoint of battery size reduction and positive electrode capacity, the positive electrode active material layer preferably has a thickness (thickness per side) of 30 μm to 100 μm.

The positive electrode active material layer includes a positive electrode active material, and may further include a positive electrode conductive agent and a positive electrode binding agent where necessary.

The positive electrode active material is a material that can be used in a lithium-ion secondary battery and is not specifically limited. Examples of the positive electrode active material include lithium-containing transition metal oxides such as lithium cobalt oxide ($LiCoO_2$), lithium nickel oxide ($LiNiO_2$), and lithium manganese oxide ($LiMn_2O_4$).

From the viewpoint of battery size reduction and energy density increase, a lithium-containing composite oxide represented by the general formula $Li_xNi_yM_{1-y}O_2$ (where M is at least one member selected from the group consisting of Na, Mg, Sc, Y, Mn, Fe, Co, Cu, Zn, Al, Cr, Pb, Sb, and B, $0<x\le1.2$, and $0.5\le y\le1.0$) is preferably used as the positive electrode active material.

Furthermore, from the viewpoint of battery size reduction and energy density increase, a lithium-containing composite oxide represented by the general formula $Li_xNi_yCo_zM_{1-y-z}O_2$ (where M is at least one member selected from the group consisting of Mg, Ba, Al, Ti, Sr, Ca, V, Fe, Cu, Bi, Y, Zr, Mo, Tc, Ru, Ta, and W, $0.9\le x\le1.2$, $0.3\le y\le0.9$, $0.05\le z\le0.5$, and $0.01\le1-y-z\le0.3$) is preferably used as the positive electrode active material.

Hereinafter, an example of the method for manufacturing the secondary battery 28 will be described.

Battery components, including an insulating gasket 61, a core 55, a negative electrode 56, a positive electrode 57, a separator 58, and a battery case 51, are stored and dried under vacuum at 100° C. Thereafter, a battery is manufactured as below with a dew point of −50° C. or lower.

For example, a round stainless-steel bar (diameter: 1 mm) is used as the core 55. The core 55 is placed in contact with a portion of the negative electrode 56 where a negative electrode collector is exposed, such that a first resistance welding electrode in a needle-like shape and a second resistance welding electrode in a plate-like shape are opposed to each other via the negative electrode 56 and the core 55. The first resistance welding electrode is placed in contact with the surface of the negative electrode 56, the second resistance welding electrode is placed in contact with the collector, and current is applied between the first and second resistance welding electrodes, so that the negative electrode 56 and the collector are joined by resistance welding in multiple portions along the axial direction X of the core 55.

Thereafter, the negative electrode 56 is wound around the collector, along with the separator 58 and the positive electrode 57, thereby forming a group of wound electrodes 52 as shown in FIG. 4. After the negative electrode 56, the positive electrode 57, and the separator 58 are wound, polypropylene adhesive tape may be used to securely attach the electrode group on the outermost layer of the wound electrode group. Moreover, the core 55 passes at one end 59 through the insulating gasket 61 and has an insulating cap 60 attached on the other end.

The electrode group 52 is placed in a plastic container, and thereafter an electrolyte is poured into the container so that the electrode group 52 is immersed in the electrolyte. Thereafter, the electrode group 52 is impregnated with the electrolyte under reduced pressure.

The electrode group 52 including the electrolyte is removed from the container, and inserted into an aluminum battery case having a bottomed cylindrical shape (diameter: 4 mm, and height: 20 mm), the insulating gasket 61 is placed in an opening of the battery case 51, and the open end of the battery case 51 is pressed and folded tightly over the insulating gasket 61, thereby sealing the battery case 51. In this manner, a small-sized lithium-ion secondary battery (diameter: 4 mm, and height: 20 mm) with a nominal capacity of 18 mAh, for example, can be obtained. The appearance, size, and structure of the secondary battery are not limited to the above, so long as the secondary battery has an elongated shape within the aforementioned dimensional range (diameter D: 2 to 6 mm, and length L: 15 to 35 mm, for example).

Next, Embodiment 2 of the present invention will be described.

(Embodiment 2)

Figure 5:
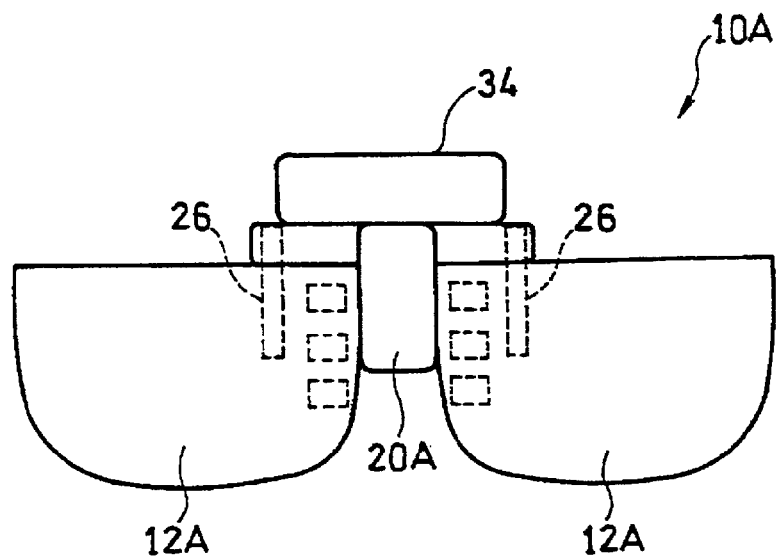
FIG. 5 is a front view of a stereoscopic image viewing device according to another embodiment of the present invention.
Figure 6:
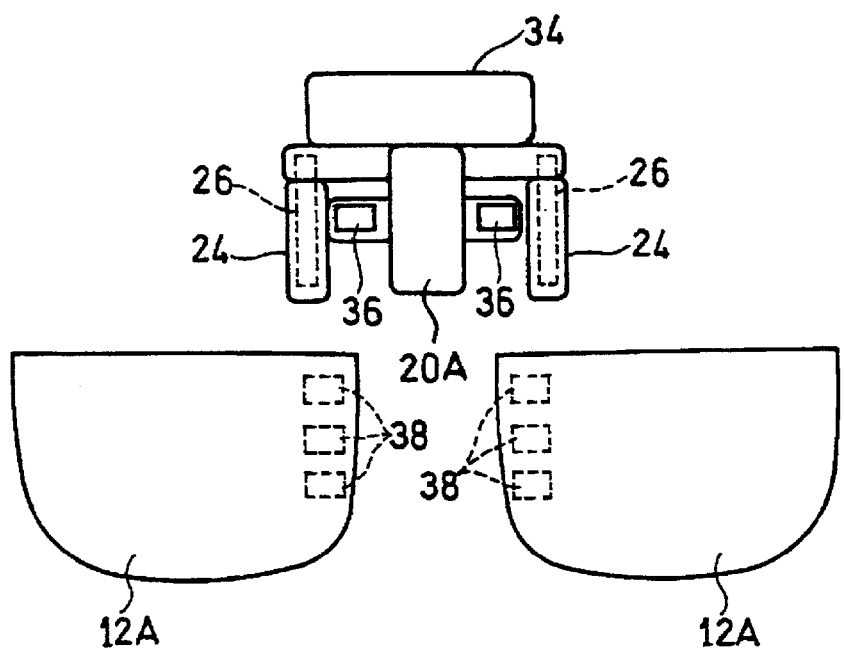
FIG. 6 is an exploded front view of the viewing device in FIG. 5.

FIG. 5 is a front view of a stereoscopic image viewing device according to Embodiment 2 of the present invention. FIG. 6 is an exploded front view of the viewing device.

The viewing device 10A includes an attaching mechanism removably attaching a pair of left and right light shutters 12A to a bridge 20A. Furthermore, the viewing device 10A is configured such that that the positions at which the attaching mechanism attaches the light shutters 12A to the bridge 20A can be vertically adjusted.

The attaching mechanism can be configured by recesses or projections of the bridge and projections or recesses of the light shutters. In the example shown in the figure, a pair of recesses 36 are provided to the left and the right of the bridge 20A so as to be open on the front side of the attaching mechanism, and a plurality of projections 38 to be engaged with their respective recesses 36 are provided at inside edges of the back of the light shutter 12A. The projections 38 are vertically arranged at predetermined intervals on the light shutters 12A.

With this configuration, the user can more comfortably view 3D images by selecting light shutters 12A of the size that matches the size of his/her own eyeglasses and attaching the light shutters 12A to the bridge 20A. Moreover, by changing between the vertically arranged projections 38 of the light shutters that are engaged with the recesses 36 of the bridge, the light shutters 12A of the viewing device 10A can be adjusted in their vertical positions such that the lenses of the eyeglasses are better aligned with the light shutters 12A. Note that when only a pair of projections 38 are provided at the inside edges of the light shutters 12A, it is simply possible to replace the light shutters 12A.

Figure 7:
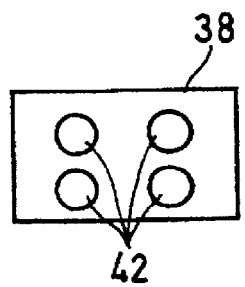
FIG. 7 is a plan view illustrating details of a projection.
Figure 8:
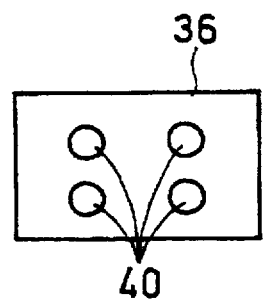
FIG. 8 is a plan view illustrating details of a recess.

Here, as shown in FIGS. 7 and 8, the recesses 36 and the projections 38 can be provided with connectors 40 and 42 to be coupled to each other when the recesses 36 and the projections 38 are engaged. The connectors 40 of the recesses (in the bridge) are connected to the driver circuit 14, and the connectors 42 of the projections (on the light shutters) are connected to unillustrated electrodes of the light shutters 12A. Thus, by engaging the recesses 36 with the projections 38, the driver circuit 14 and the light shutters 12A are connected.

The above configuration makes it possible for users of normal eyeglasses to more comfortably view 3D images.

INDUSTRIAL APPLICABILITY

The stereoscopic image viewing device of the present invention allows the user of normal eyeglasses to more comfortably view 3D images, and therefore is useful for long hours of 3D image viewing in a movie theater and 3D image viewing on a 3D television in a household with small children.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

EXPLANATION OF REFERENCE NUMERALS 10, 10A stereoscopic image viewing device
12, 12A light shutter
14 driver circuit
16 power source unit
22 clip
28 secondary battery
30 charge/discharge circuit
34 support
36 recess
38 projection
40, 42 connector

The invention claimed is:

1. A stereoscopic image viewing device to be attached to eyeglasses, comprising:
   a pair of light shutters for right and left eyes;
   a driver circuit for the light shutters;
   a power source unit for driving the light shutters;
   a bridge for supporting the light shutters at their inside edges;
   a binding portion for removably binding the stereoscopic image viewing device to the eyeglasses; and
   a support for supporting the driver circuit and the power source unit, said support securing the driver circuit and the power source unit to the bridge,
   the power source unit including a secondary battery, and
   the binding portion and the support being integrally formed with the bridge, such that the binding portion and the support are permanently fixed to the bridge.

2. The stereoscopic image viewing device according to claim 1, wherein the driver circuit, the power source unit, and the support are arranged such that the viewing device has a center of gravity positioned within 10 mm from a plane that passes through a center of gravity of the bridge and is perpendicular to a segment connecting centers of gravity of the light shutters.

3. The stereoscopic image viewing device according to claim 1, wherein the secondary battery has a cylindrical or rectangular shape with a diameter or width of 2 mm to 6 mm.

4. The stereoscopic image viewing device according to claim 1, comprising an attaching mechanism for removably attaching the light shutters to the bridge.

5. The stereoscopic image viewing device according to claim 4, wherein positions at which the light shutters are attached to the bridge by the attaching mechanism are vertically changeable.

6. The stereoscopic image viewing device according to claim 5, wherein,
   the attaching mechanism includes:
   projections provided at the inside edges of the light shutters, the projections having the same shape and being situated at vertically different positions;
   a pair of recesses provided in the bridge so as to be engageable with and detachable from the projections;
   first connectors provided at their respective projections and connected to the light shutters; and
   second connectors provided at the recesses and connected to the driver circuit,
   one of the recesses is engaged with one of the projections provided at one of the light shutters,
   the other of the recesses is engaged with one of the projections provided at the other of the light shutters, and
   when the projections are in engagement with the recesses, the first and second connectors are coupled so that the light shutters and the driver circuit are connected to each other.

7. The stereoscopic image viewing device according to claim 5, wherein,
   the attaching mechanism includes:
   recesses provided at the inside edges of the light shutters, the recesses having the same shape and being situated at vertically different positions;
   a pair of projections provided at the bridge so as to be engageable with and detachable from the recesses;
   first connectors provided at their respective recesses and connected to the light shutters; and
   second connectors provided at the projections and connected to the driver circuit,
   one of the projections is engaged with one of the recesses provided at one of the light shutters,
   the other of the projections is engaged with one of the recesses provided at the other of the light shutters, and
   when the recesses are in engagement with the projections, the first and second connectors are coupled so that the light shutters and the driver circuit are connected to each other.

8. The stereoscopic image viewing device according to claim 4, wherein,
   the attaching mechanism includes:
   projections respectively provided at the inside edges of the light shutters;
   a pair of recesses provided in the bridge so as to be engageable with and detachable from the projections;

first connectors provided at the projections and connected to the light shutters; and second connectors provided at the recesses and connected to the driver circuit, and when the projections are in engagement with their respective recesses, the first and second connectors are coupled so that the light shutters and the driver circuit are connected to each other.

9. The stereoscopic image viewing device according to claim 4, wherein, the attaching mechanism includes:

recesses provided at the inside edges of the light shutters;

a pair of projections provided at the bridge so as to be engageable with and detachable from the recesses;

first connectors provided at the recesses and connected to the light shutters; and second connectors provided at the projections and connected to the driver circuit, and when the recesses are in engagement with their respective projections, the first and second connectors are coupled so that the light shutters and the driver circuit are connected to each other.

10. The stereoscopic image viewing device according to claim 1, wherein the binding portion includes a fixed member secured on the bridge, and a movable member biased toward the fixed member by a biasing part.

11. The stereoscopic image viewing device according to claim 1, wherein the driver circuit controls the light shutters such that a right eye light shutter and a left eye light shutter are alternately opened and closed in synchronization with the switching of images intended for a right eye and a left eye.

* * * * *